(12) United States Patent
Sabet

(10) Patent No.: US 7,870,075 B1
(45) Date of Patent: Jan. 11, 2011

(54) SYSTEM AND METHOD FOR MANAGING SOFTWARE DEVELOPMENT

(75) Inventor: Mona Sabet, San Carlos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 686 days.

(21) Appl. No.: 11/643,756

(22) Filed: Dec. 20, 2006

(51) Int. Cl.
G06F 21/00 (2006.01)

(52) U.S. Cl. .............................. 705/52; 705/50; 705/51; 705/53; 705/54; 705/55; 705/901; 705/902; 705/903; 705/904; 705/905; 705/56; 705/57; 705/58; 705/59; 705/900; 380/201; 380/202; 380/203; 380/204; 713/182; 713/183; 713/184; 713/185; 713/186

(58) Field of Classification Search ............. 705/50–59, 705/900–905; 380/201–204; 713/182–186
See application file for complete search history.

(56) References Cited

U.S. PATENT DOCUMENTS

| | | | |
|---|---|---|---|
| 5,629,980 A * | 5/1997 | Stefik et al. .................... 705/54 |
| 2005/0125358 A1 | 6/2005 | Levin et al. |
| 2005/0125359 A1 | 6/2005 | Levin et al. |

FOREIGN PATENT DOCUMENTS

WO   WO 2006031127 A2 *  3/2006

OTHER PUBLICATIONS

Robertson "Open-Source Content Management Systems" Business Management Feb. 6, 2004, pp. 106-109.*

Vetter "" Infectious" Open Source Software: Spreading Incentives or Promoting Resistance?" Rutgers Law Journal (Oct. 2005) vol. 36:53 pp. 53-162.

Robertson "Open-Source Content Management Systems" Business Management Feb. 6, 2004, pp. 106-109.

Dahlander et. al. "Relationships Between Open Source Software Companies and Communities: Observation from Nordic Firms" Reserach Policy 34 (Sep. 8, 2005) pp. 481-493.

Mockus et. al. "Two Case Studies of Open Source Software Development: Apache and Mozilla" ACM Transaction on Software Engineering and Methodolgy, vol. 11, No. 3, Jul. 2002, pp. 309-346.

Dinkelacker et. al. "Progressive Open Source" (2002) Hewlett-Packard Company Palo Alto, CA 94303 pp. 177-184.

Koponen et. al. "Open Source Software Maintenance Process Framework" May 2005 ACM 1-59593-127-9.

Michelinakis "Open Source Content Management Systems: An Argumentative Approach" Aug. 2004.

Chavan et. al. "Open-Source Learning Management with Moodle" Linux Journal Dec. 1, 2004 pp. 66-70.

Littlejohn "Reusing Online Resources: A Sustainable Approach to E-learning" Kogan Page Limited, Apr. 28, 2003 pp. 70-71.

(Continued)

*Primary Examiner* — James A Reagan
(74) *Attorney, Agent, or Firm* — Vista IP Law Group LLP

(57) ABSTRACT

A system and method of managing external content that is used within a software product or software development process is disclosed. In some approaches, the system and method manages and tracks the use of external content, as well an approval process for determining whether the external content is to be used or incorporated. The system and method manages and tracks compliance with terms and restrictions of the external content.

34 Claims, 16 Drawing Sheets

OTHER PUBLICATIONS

Tansley et. al. "The DSpace Open Source Digital Asset Management System: Challenges and Opportunities", Lecture Notes in Computer Science, vol. 3652, Sep. 2005, pp. 242-253.

Smith et. al. "An Open Source Dynamic Digital Repository" D-Lib Magazine Jan. 2003 vol. 9 No. 1 pp.

Han "Digital content management: the search for a content management system", Library Hi Tech, vol. 22 Iss: 4, pp. 355-365 Feb. 20, 2004.

Fogel "Producing Open Source Software: How to Run a Successful Free Software Project" (2005).

Hein "Open Source Software: Risks and Rewards" Aug. 3, 2005, V2.0.

Krogh et. al. "Knowledge Reuse in Open Source Software: An Exploratory Study of 15 Open Source Projects" Proceddings of the 38th Hawaii International Conference on System Sciences IEEE (Jan. 2005).

Elliott et. al. "Free software Development: cooperation and Conflict in a Virtual Organizational Culture" Aug. 2003 Institute of Software Research University of California, Irvine, CA 92697.

Feller et. al. "Taking Stock of the Bazaar Proceedings of the 3rd Workshop on Open Source Software Engineering" International conference on Software Engineering Portland Oregon. May 3-11, 2003.

Crowston et. al. "Defining Open Source Software Project Success" School of Information Studies, Syracuse University, Syracuse, NY Twnety-Fourth International conference on Information Systems (2003).

Pal et. al. "Competing on Open Source: Strategies and Practise" (2002) Indian Institute of Management-Bangalore.

Asklund "Configuration Management for Open Source Software" Aalborg University Department of Computer Science. Jan. 2001.

Becking et. al. "MMBase: An Open-Source Content Management System" IBM System Journal, vol. 44, No. 2. 2005 pp. 381-397.

Asklund et al. "A study of configuration Management in Open Source Software Projects" Lund Institute of Technology, Box 118, SE-221 00 Lund Sweden (2002).

Kenwood "A Business Case Study of Open Source Software" Jul. 2001 MIRTE Washington C3 Center, Bedford, Massachusetts.

Dehlander "Appropriating the Commons: Firms in Open Source Software" Apr. 13, 2004 Department of Industrial Dynamics School of Technology Management and Economics Chalmers University of Technology, Vasahus 2 SE-412 96 Gothenburg.

Sabet "Management of Open Source Software" Jan. 14, 2005 Cadence University.

* cited by examiner

SYSTEM AND METHOD FOR MANAGING SOFTWARE DEVELOPMENT

BACKGROUND AND SUMMARY

The invention relates to a system and method for managing external content that is to be used or integrated with an organization's software product.

Traditionally, the software or other content development process for a company or organization seeking to create a commercial product involved activities for creating a product that substantively originates from within the company itself. Originating the product from only within the company ensures the proprietary nature of the product and removes any doubt as to the ownership of the product. This approach also ensures that the company or organization itself has the right to set the terms and conditions under which the product is provided to other parties.

Over time, a new model of development has begun to emerge in which a company will use external content, such as software code, images, video, or other content from an external source, to build its commercial product. There are many reasons for this shift in attitude. For one, many modern development projects have become so large that it has become impractical, given realistic commercial development timetables, for a company to internally create the entirety of the content it needs for a given project. Moreover, the growth of the Internet has provided easy access to content, such as software code examples and ready-to-use modules that are exemplary implementations of functions and algorithms needed by the product, often made by experts and specialists that operate better than the company's own efforts. It is often far easier, faster, and more efficient for a company to use, modify, or integrate the external content into its product instead of internally creating the corresponding content.

There are many types of external content that a company may use or distribute in conjunction with its products. For example, the external content may correspond to external software that is organized as a entire program or a set of one or more code modules. This type of external software is modified and integrated into a company's product, sometimes resulting in the company's product being a "derivative work" of the external content. Another example type of external software that may be utilized is a software library. Such libraries correspond to software that are called and linked into a company's products, either statically or dynamically. Another example type of external software that may be used by a company are standalone programs that are not integrated into the company's software code, but are distributed with and called by the company's product. Yet another type of external software includes software tools that are used to create the company's products, such as code compliers, user interface builders, and database builders. Many other examples exist of external software and other content that may be used by a company to build its commercial product.

Since the external content is created by a third party, that third party is typically the copyright owner of the external content. As such, the third party has the right to set the terms and conditions under which its external content may be used by others. These terms and conditions may be set forth in a license agreement, in which the third party is the licensor and the company, organization, or individual seeking to use the external content is the licensee. The license terms may be nothing more than several lines of terms and restrictions in a header file, Readme file, or integrated into a comment section within the content files. On the other hand, the license agreement may be structured as a formal document having numerous contract terms and conditions.

The external content may be acquired in a commercial transaction, in which a third party derives income from allowing companies and individuals to use and integrate its software product. Licenses for such commercial sources of external content are typically associated with very restrictive license terms regarding confidentiality and distribution of the external content to other parties.

The external content may be freeware, in which there is no monetary cost and few if any restrictions associated with using the external content. The external content may be public domain content which is dedicated to the public with no ownership or use restrictions.

The external content may also be "open source" software, which typically refers to software that is provided to be used by others at no monetary cost, but which is also typically associated with an open source license that contain restrictions on a party's ability to use, reproduce, and modify the open source software. Some open source software have limited restrictions on its use by others, merely requiring, for example, that a specified set of notices or attributions of origination be retained by the user of that software. Other open source software are much more restrictive in its terms and conditions. For example, open source software licensed under the GPL ("General Public License") license agreement requires any derivative or modified work based upon the GPL software to be accessible to other third parties as open source under the GPL terms and conditions, forbids any income from sale or license of the work itself, and mandates that third parties must have the right to access the source code of the modified or derivative work.

As is evident, it is important for a company to manage whether and how external content is to be used or integrated with its product. For example, given the restrictive conditions of GPL-type open source software, a company seeking to create a commercial product may wish to undergo a stringent review process before allowing GPL-based external content to be used in its commercial product. On the other hand, a company may not need much review, if any at all, to decide whether to use certain freeware in its product. Once a company decides to use the external content, there is likely to be terms and conditions that the company will need to track for implementation and compliance.

Embodiments of the present invention relate to a system and method of managing external content that is used or integrated with a product or development process. In some embodiments, the system and method manages and tracks the use of external content, as well an approval process for determining whether the external content is to be used or incorporated. In some embodiments, the system and method manages and tracks compliance with terms and restrictions of the external content. Other and additional objects, features, and advantages of the invention are described in the detailed description, figures, and claims.

DETAILED DESCRIPTION

The present invention relates to a system and method of managing external content that is used or integrated with a product or development process. In some embodiments, the system and method manage and track the use of external content, as well an approval process for determining whether the external content is to be used or incorporated. In some embodiments, the system and method manages, audits, and tracks compliance with terms and restrictions of the external content.

According to some embodiments, the invention provides an automated process for managing and approving the use of external content based upon the identification and type of content that is sought for use. The automated approval process is based in some embodiments upon the specific license rights associated with the external content and the type of use that is contemplated. By identifying the type of license under which external content is licensed, the invention can determine whether or not, and under what conditions, the external content is permitted to be used. The licenses can be organized into categories by license contents, e.g., based upon scope of rights, obligations, and possible liabilities imposed by the license. For example, GPL-type licenses with significant licensing obligations may be placed into a category that is very restrictive with respect to automated approvals. On the other hand, freeware-type licenses with minimal licensing obligations may be placed into a category that is more permissive with respect to automated approvals. The specific category of a license associated with an item of external content can then be used to facilitate the process for managing and determining approvals for using the external content.

Figure 1:
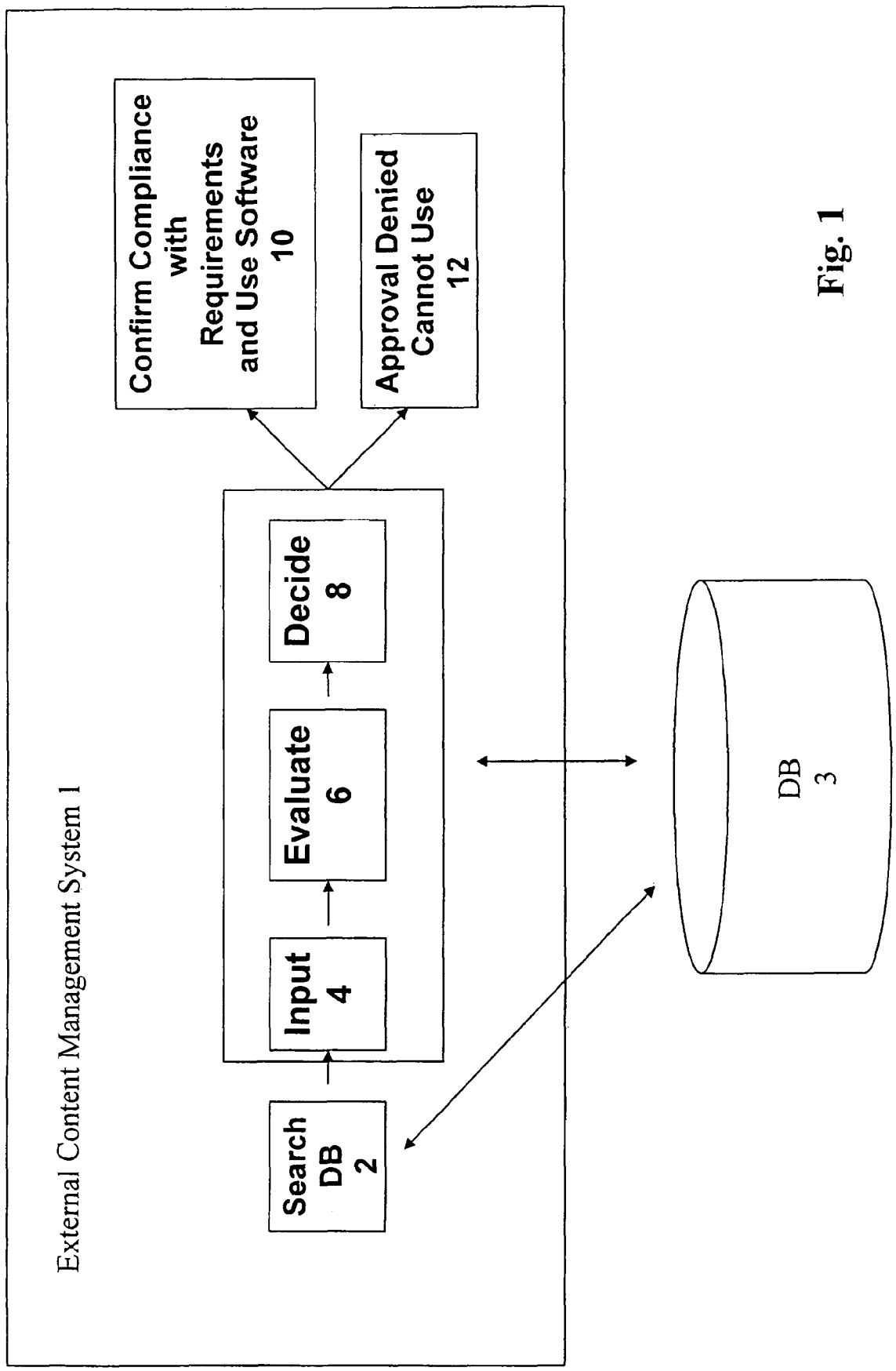
FIG. 1 shows a high-level diagram of a system for implementing an embodiment of the invention for managing external content.

FIG. 1 shows a high-level flow of a system for managing external content according to an embodiment of the invention. The embodiment uses an external content management system 1 comprising a database 3 of information about external content. An example of a type of information that is maintained in the database includes license information regarding the external content. Assume that a request has been made to use or manage an item of external content. At 2, the system 1 searches the database to see if the license that applies to the external content is already in the system. The search could be performed, for example, either by license or the identification of the external content.

At 4, the information about the anticipated use of the external content is input into the management system to guide the management and approval process. If the license is found in the system but not the external content, then information about the external content and the anticipated use of it with internal materials is input into the system. If both the license and the external content is found in the system, then information about the anticipated use of the external content with internal materials is input into the system. If the license is not found in the system, then the license is input for review and entry into system. Once the license is entered, information about external content and the anticipated use of it is input with internal materials.

At 6, evaluation is performed to determine whether approval will be given to use the external content. In one embodiment, the evaluation begins by system routing the submission for appropriate approval. There are any number of levels of approval depending up the category of the license being considered.

Based upon the category of the license as identified in the system, a decision is made at 8 regarding whether approval will be given for the use of the external content. If the requirements of use and the restrictions on use of the external content do not allow the external content to be used as anticipated, then the submission will be denied at 12. If there is no conflict between requirements and restrictions, and confirmation can be made of compliance with the restrictions and requirements imposed by the applicable license, submission will be logged as approved and certain requirements will be automatically generated for use at 10.

Figure 2A:
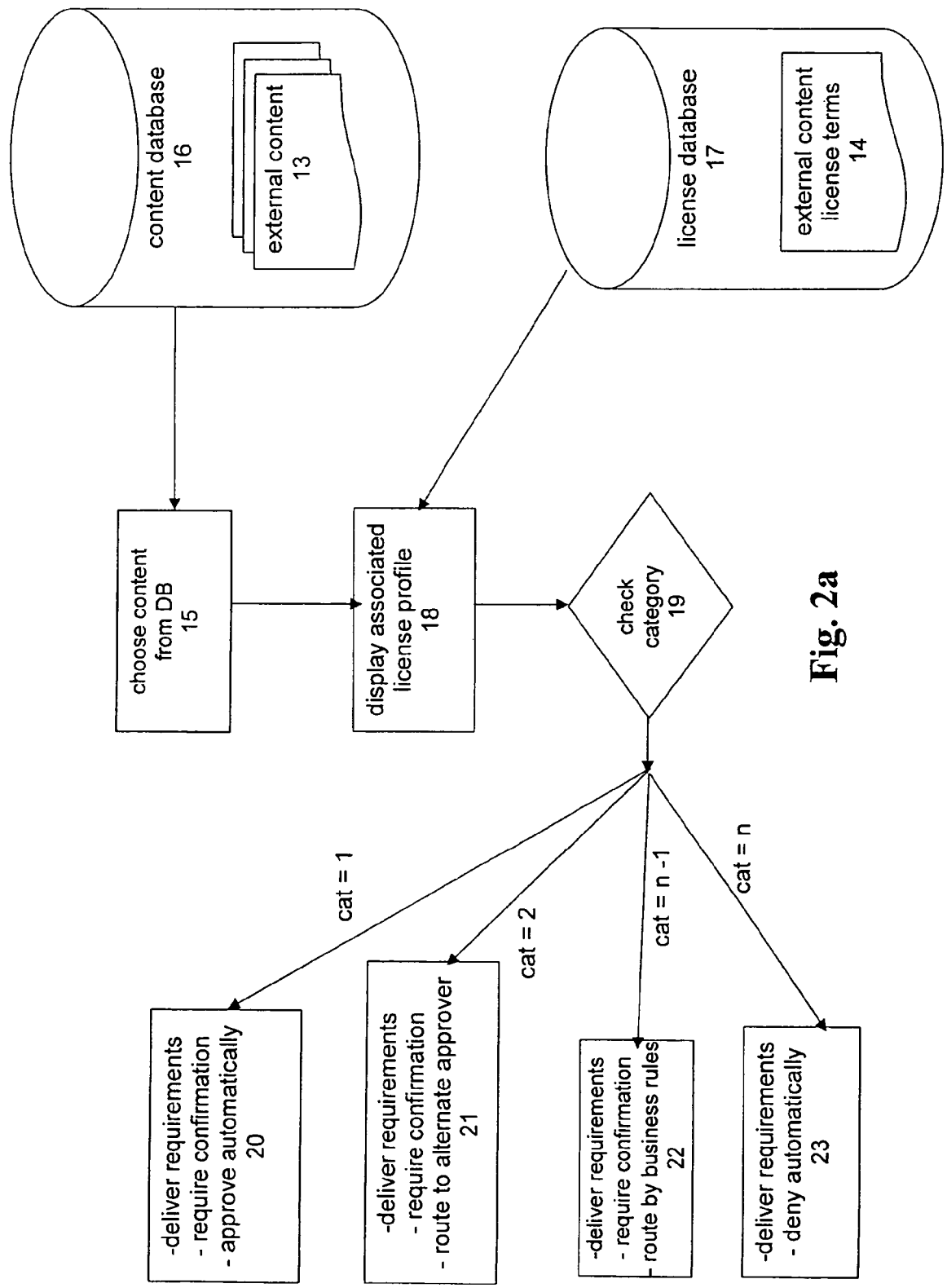
FIGS. 2*a-d* illustrate embodiments of approval processes for external content according to some embodiments of the invention.

FIG. 2a shows a flow of an approval process when information about both the applicable license 14 and the external content 13 are already in the database. At 15, the process chooses the appropriate information from a content database 16 and license database 17. The content database 16 stores information regarding external content and relates the external content to its associated license. For example, a "profile" can be established for the external content which contains information about the external content, such as the external content identifier and usage model. The license database 17 stores information regarding licenses. Profiles can also be established for the licenses that contain information about the different licenses, such as license category and license requirements. While two separate databases 16 and 17 are shown in the figure, data may be stored only one or in any number of databases, and therefore the number of databases used may vary depending upon the particular use to which the invention is directed.

The license profile for the specific external content under examination is accessed at 18. As previously stated, different categories of licenses may present different levels of risks and burdens to an organization. At 19, the category of the license under examination is reviewed to determine the approval path for the submission.

Any number of categories may exist for the licenses, and therefore, any number of possible approval paths may also exist. For example, assume that a first category of license exists for which the organization has already determined may be approved automatically. This category may be of a type that is deemed to present minimal risks or burdens to the organization. The category examination of 19 may identify this category type and provide automated approval of the submission at 20. The system may automatically deliver the license requirements for the license to the requester as well as requiring appropriate confirmation of the content use.

As another example, a second category of license may exist for which sufficient risks is deemed to exist such that approval is not automatically provided, but that the submission must be routed to a secondary approver before approval can be given. The category examination of 19 may identify this category type to route the submission to an appropriate secondary approver at 21. The system may automatically deliver the license requirements for the license to the requester as well as requiring appropriate confirmation of the content use.

As yet another example, a third category of license may exist for which the license is identified as being subject to a set of business rules for further routing of the submission before approval can be granted. The category examination of 19 may identify this category type to route the submission as appropriate at 22. The system may automatically deliver the license requirements for the license to the requester as well as requiring appropriate confirmation of the content use.

Another example category of license may exist for which the license is identified as being excessively risky or burdensome to the organization, and therefore the submission is automatically denied for usage within the organization's products. The category examination of 19 may identify this category type and automatically deny approval at 23. The system may automatically deliver the license requirements as part of the process.

Figure 2B:
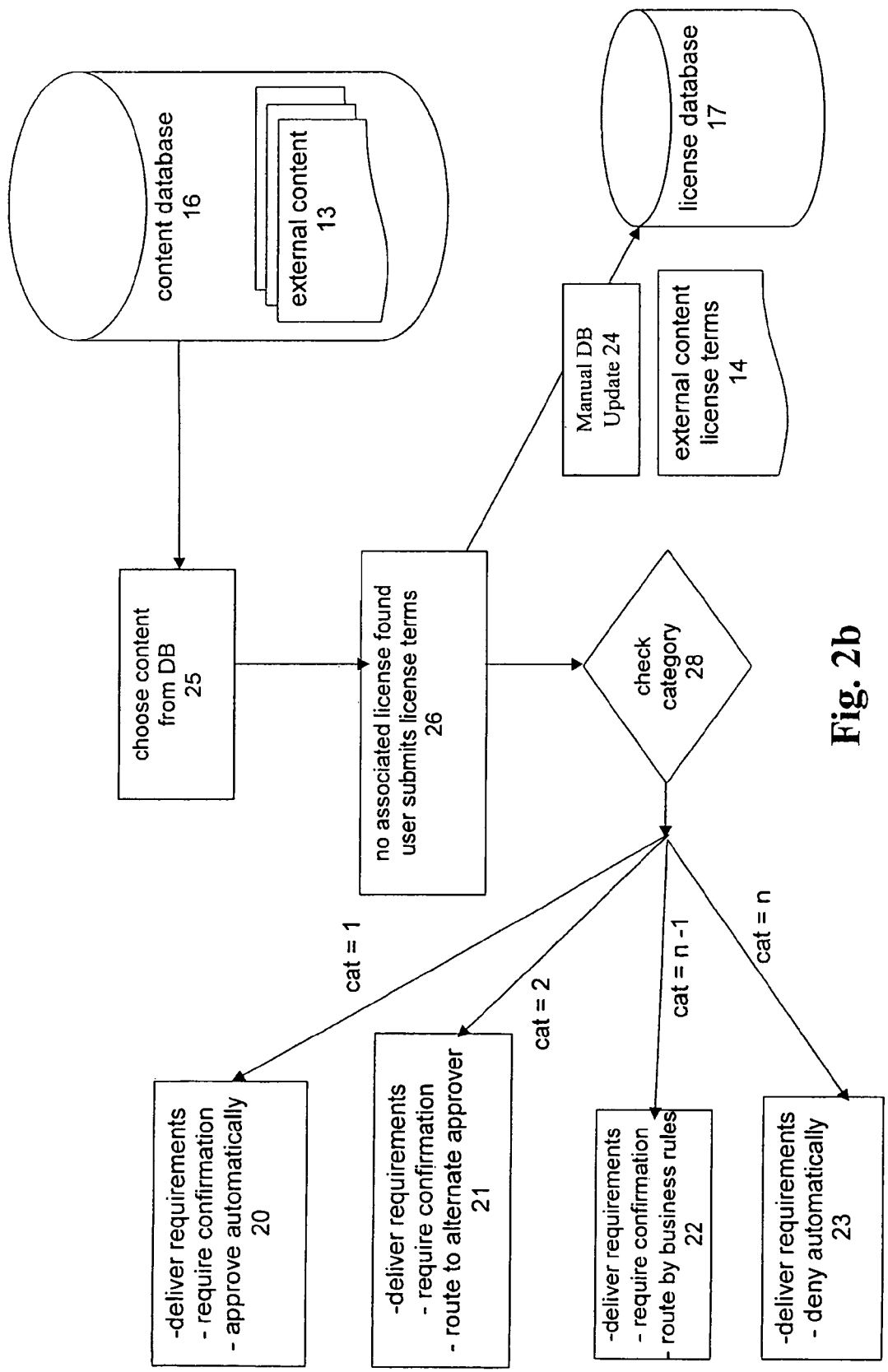

FIG. 2b shows a flow of an approval process when information about the external content 13 is already in the system database, but information about the external content's corresponding license 14 is not in the system database. At 25, the process searches for and chooses the appropriate content from a content database 16. Since information already exists for the external content 13 in the content database 16, this stored information for the external content 13 can be found and chosen from the content database 16.

Since the license database 17 does not include information 14 regarding the license associated with the external content 13, then at 26, the process causes the license information/terms 14 to be input to the license database 17. In some embodiments, at 24, the user that request permission to use the external content is the entity that is tasked with the responsibility to manually input the license terms 14 into system so that it can be loaded into the license database 17.

At 28, the category of the license under examination is reviewed to determine the appropriate approval path for the submission. As noted above, any number of categories may exist for the licenses, and therefore, any number of possible approval paths may also exist. If the license corresponds to the first category of license for which the organization has already determined may be approved automatically, then the category examination of 28 may identify this category type and provide automated approval of the submission at 20. If the license corresponds to the second category of license which requires routing to a secondary approver before approval can be given, then the category examination of 28 may identify this category type to route the submission to an appropriate secondary approver at 21. If the license corresponds to the third category of license which is subject to a set of business rules for further routing of the submission, then the category examination of 28 may route the submission as appropriate at 22. If the license is identified as being in the category which is excessively risky or burdensome to the organization, then the category examination of 28 may identify this category type and automatically deny approval at 23. The system may automatically deliver the license requirements as part of the process or require appropriate confirmations as required.

Figure 2C:
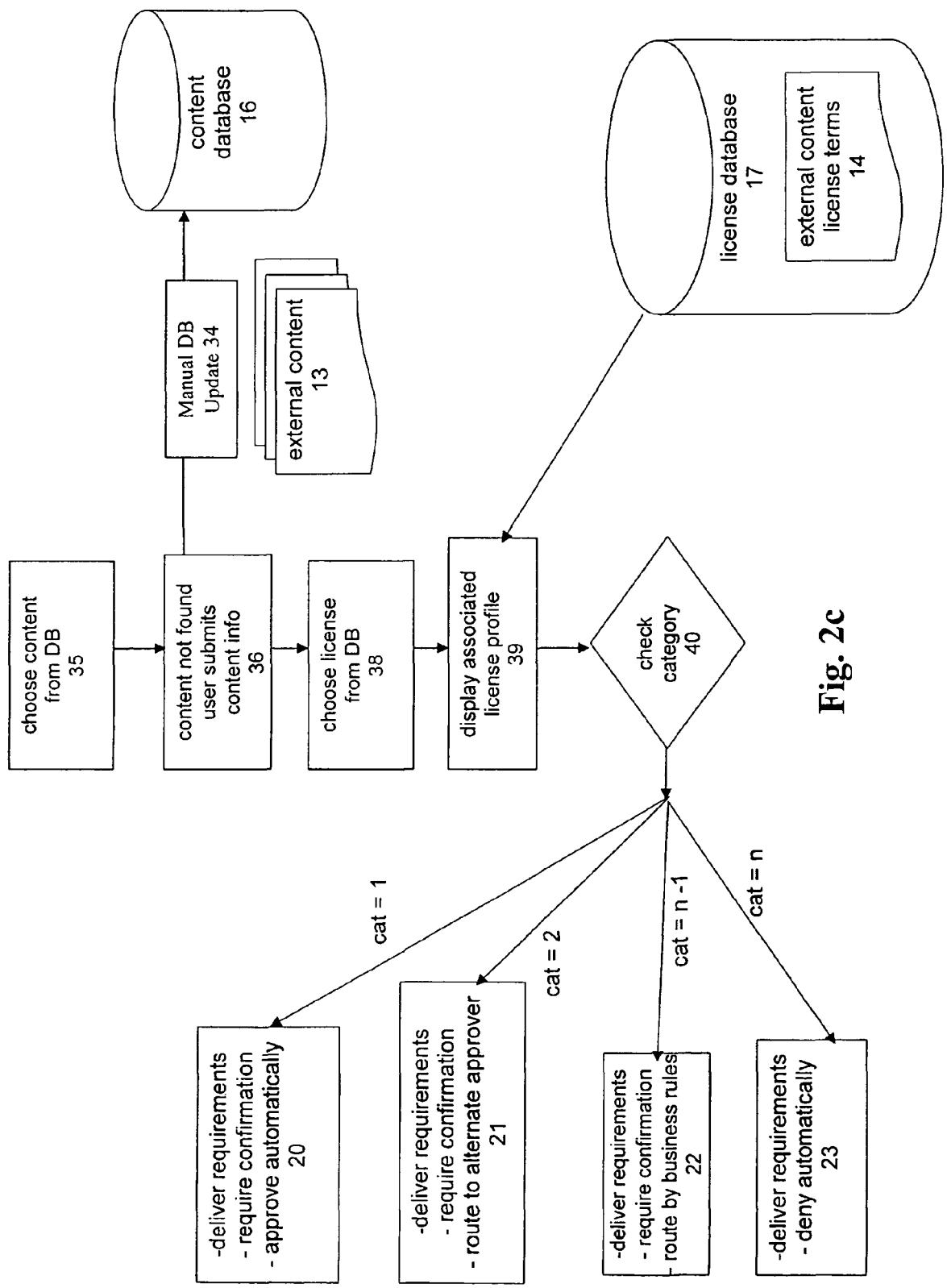

FIG. 2c shows a flow of an approval process when information about the license terms are already in the system database, but information about the external content is not yet in the system database. At 35, the process searches for and chooses the appropriate content from a content database 16. Since the content database 16 does not include information regarding the external content, then at 36, the process causes information 13 about the external content to be input to the content database 16. In some embodiments, at 34, the user that requests permission to use the external content is the entity that is tasked with the responsibility to manually input the information 13 about the external content into the system so that it can be loaded into the content database 16.

At 38, the process searches for and chooses information 14 regarding the appropriate license. Since information 14 already exists for the license in the license database 17, this stored information for the license can be suitably found, chosen, and displayed from the license database 17 at 39.

At 40, the category of the license under examination is reviewed to determine the appropriate approval path for the submission. As noted above, any number of categories may exist for the licenses, and therefore, any number of possible approval paths may also exist. If the license corresponds to the first category of license for which the organization has already determined may be approved automatically, then the category examination of 40 may identify this category type and provide automated approval of the submission at 20. If the license corresponds to the second category of license which requires routing to a secondary approver before approval can be given, then the category examination of 40 may identify this category type to route the submission to an appropriate secondary approver at 21. If the license corresponds to the third category of license which is subject to a set of business rules for further routing of the submission, then the category examination of 40 may route the submission as appropriate at 22. If the license is identified as being in the category which is excessively risky or burdensome to the organization, then the category examination of 40 may identify this category type and automatically deny approval at 23. The system may automatically deliver the license requirements as part of the process or require appropriate confirmations as required.

Figure 2D:
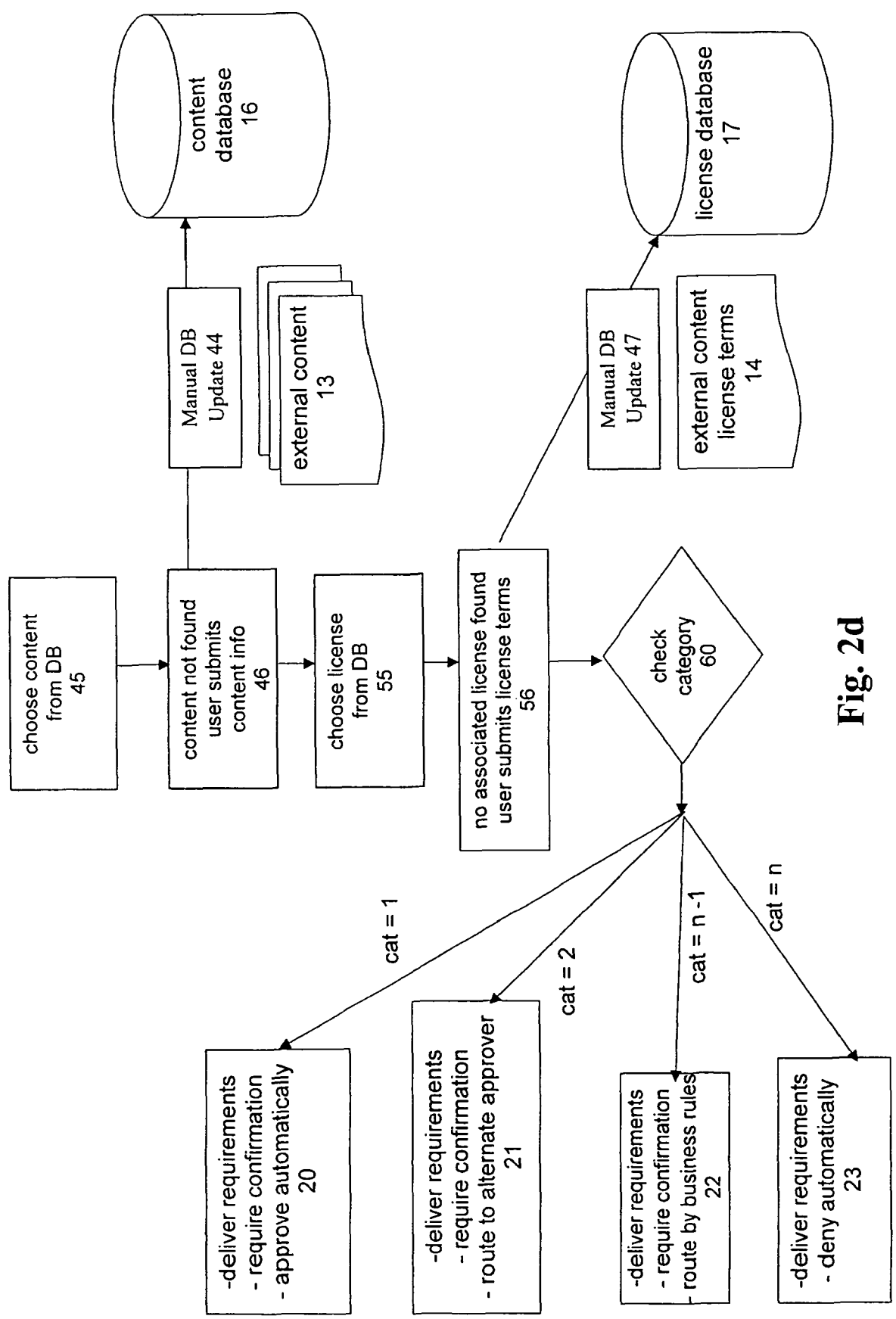

FIG. 2d shows a flow of an approval process when neither information about the license terms nor the external content are already stored in the system database.

At 45, the process searches for and chooses the appropriate content from a content database 16. Since the content database 16 does not include information regarding the external content, then at 46, the process causes information 13 about the external content to be input to the content database 16. In some embodiments, at 44, the user that request permission to use the external content is the entity that is tasked with the responsibility to manually input the information 13 about the external content into the system so that it can be loaded into the content database 16.

At 55, the process searches for and chooses information regarding the appropriate license. Since the license database 17 does not include information regarding the license associated with the external content, then at 56, the process causes the license information/terms 14 to be input to the license database 17. In some embodiments, at 47, the user that request permission to use the external content is the entity that is tasked with the responsibility to manually input the license terms 14 into system so that it can be loaded into the license database 17.

At 60, the category of the license under examination is reviewed to determine the appropriate approval path for the submission. As noted above, any number of categories may exist for the licenses, and therefore, any number of possible approval paths may also exist. If the license corresponds to the first category of license for which the organization has already determined may be approved automatically, then the category examination of 60 may identify this category type and provide automated approval of the submission at 20. If the license corresponds to the second category of license which requires routing to a secondary approver before approval can be given, then the category examination of 60 may identify this category type to route the submission to an appropriate secondary approver at 21. If the license corresponds to the third category of license which is subject to a set of business rules for further routing of the submission, then the category examination of 60 may route the submission as appropriate at 22. If the license is identified as being in the category which is excessively risky or burdensome to the organization, then the category examination of 60 may identify this category type and automatically deny approval at 23. The system may automatically deliver the license requirements as part of the process or require appropriate confirmations as required.

Figure 3:
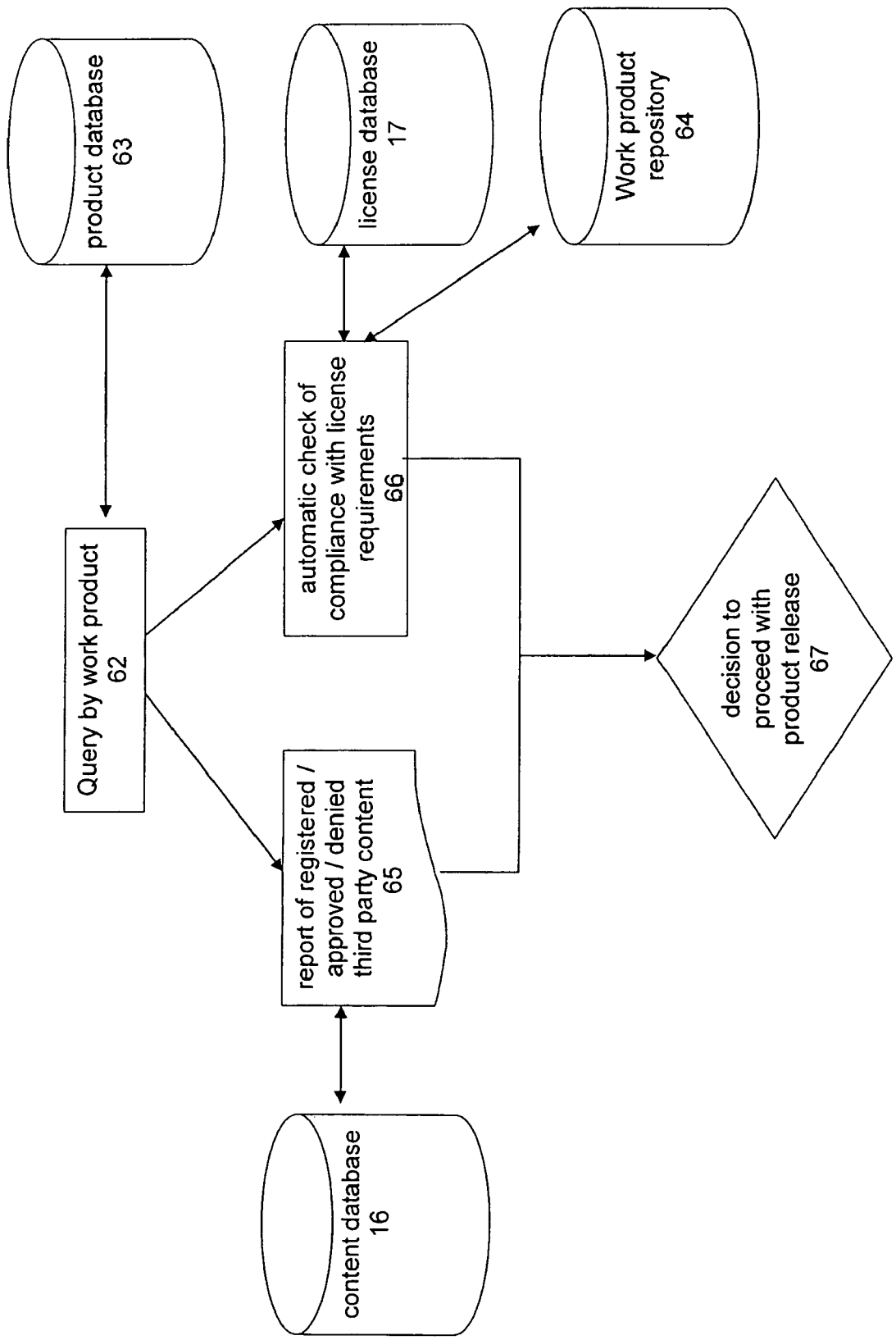
FIG. 3 shows a flow of an auditing and tracking process according to some embodiments of the invention.

Some embodiments of the present invention can be employed to perform auditing, tracking, and compliance checking of external content within an organization. FIG. 3 shows a flow of an example process for performing these functions. At 62, a query can be issued for a particular product which includes external content. The query 62 may access several data repositories. For example, the query 62 may access a product database 63, which stores information regarding the content and profiles of internal development products and documents. The product database may be used to identify all external content that is associated with the software product under examination.

At 65, a report of the external content associated with the product is provided. The content database 16 may be accessed to identify and retrieve information regarding the external content that is used or integrated with the product. In some embodiments, the report 65 identifies the registered, approved, and denied external content that is associated with the product.

At 66, a check may be performed to determine compliance with the license requirements of the external content. This action identifies specific requirements mandated by the license terms of the external content. Such requirements may include, for example, specific copyright notices in the source code, reproduction of notice or attribution statements in product documentation; mandated statements in splash screens, payment of license fees, and other such requirements. The license requirements are checked against the actual developed product, documentation, and accounting systems to determine whether the associated license requirements have been met. The license database 17 may be accessed to retrieve all licenses associated with the identified external content for the product. The work product repository 64 may also be accessed to perform action 66. The work product repository 64 stores the product (e.g., source code) or related documentation and manuals.

At 67, the results of 65 and 66 are reviewed to determine whether to proceed with release of the product. If so, a message or indicator can be created or sent to indicate sufficient compliance with the external content license requirements. Otherwise, a message or indicator can be created to identify insufficient compliance. The message or indicator can be created in or associated with the contents of the work product repository 64.

Some embodiments of the present invention can be employed to automatically perform actions to cause compliance with license requirements of the external content. As noted above, many external content licenses include specific requirements regarding the content, composition, or format of notices, attributions, or other requirements of product materials for products which include the external content. For example, many types of open source software require certain notices, such as copyright notices, to be retained and/or placed within any software code that incorporates all or part of the external content.

Figure 4:
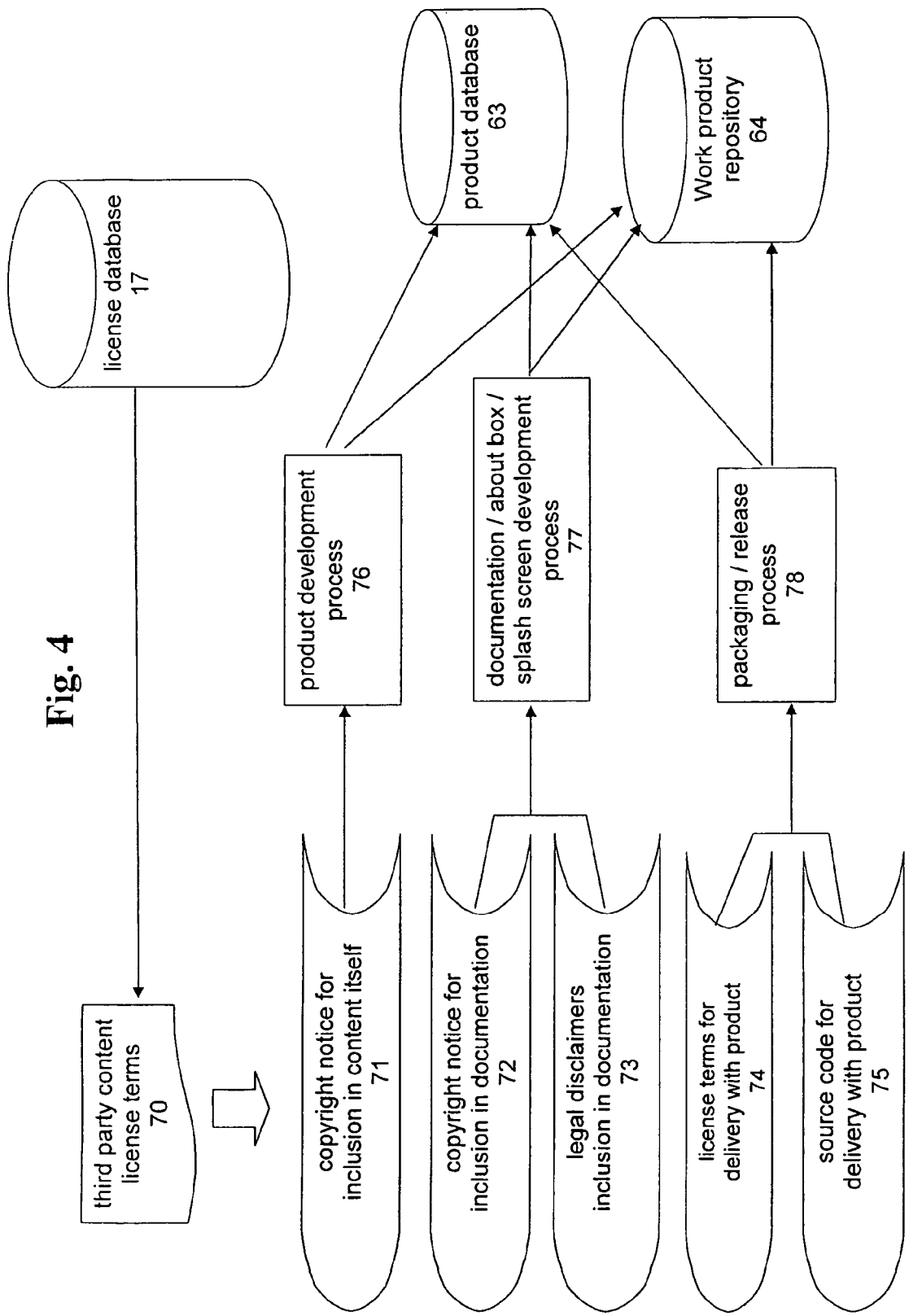
FIG. 4 shows a process for implementing compliance with license requirements of external content according to some embodiments of the invention.

FIG. 4 illustrates a flow according to some embodiments for managing and implementing compliance with license requirements. The license database 17 may be accessed to identify and retrieve the relevant license requirements/terms 70 for an external content used or integrated with a given product. These license requirements/terms 70 may be used to generate required notice statements for inclusion into the product, such as copyright notice(s) 71, which are routed to the product development process 76 for inclusion by developers and/or automatically inserted into the product in the work product repository.

The license requirements/terms 70 may be used to generate notices for inclusion into documentation, such as copyright notice(s) 72 and legal disclaimers 73 which are routed to the documentation development process (including product documentation and splash screen/about box development process) and/or for automatic insertion of such notices into the documentation or product in the work product repository.

The license requirements/terms 70 may also be used to generate notices for inclusion into packaging and release materials, such as license terms 74 and source code 75 which are routed to the packaging/release process and/or for automatic insertion of such notices into the release documentation or product.

ILLUSTRATIVE EMBODIMENT

Figure 5:
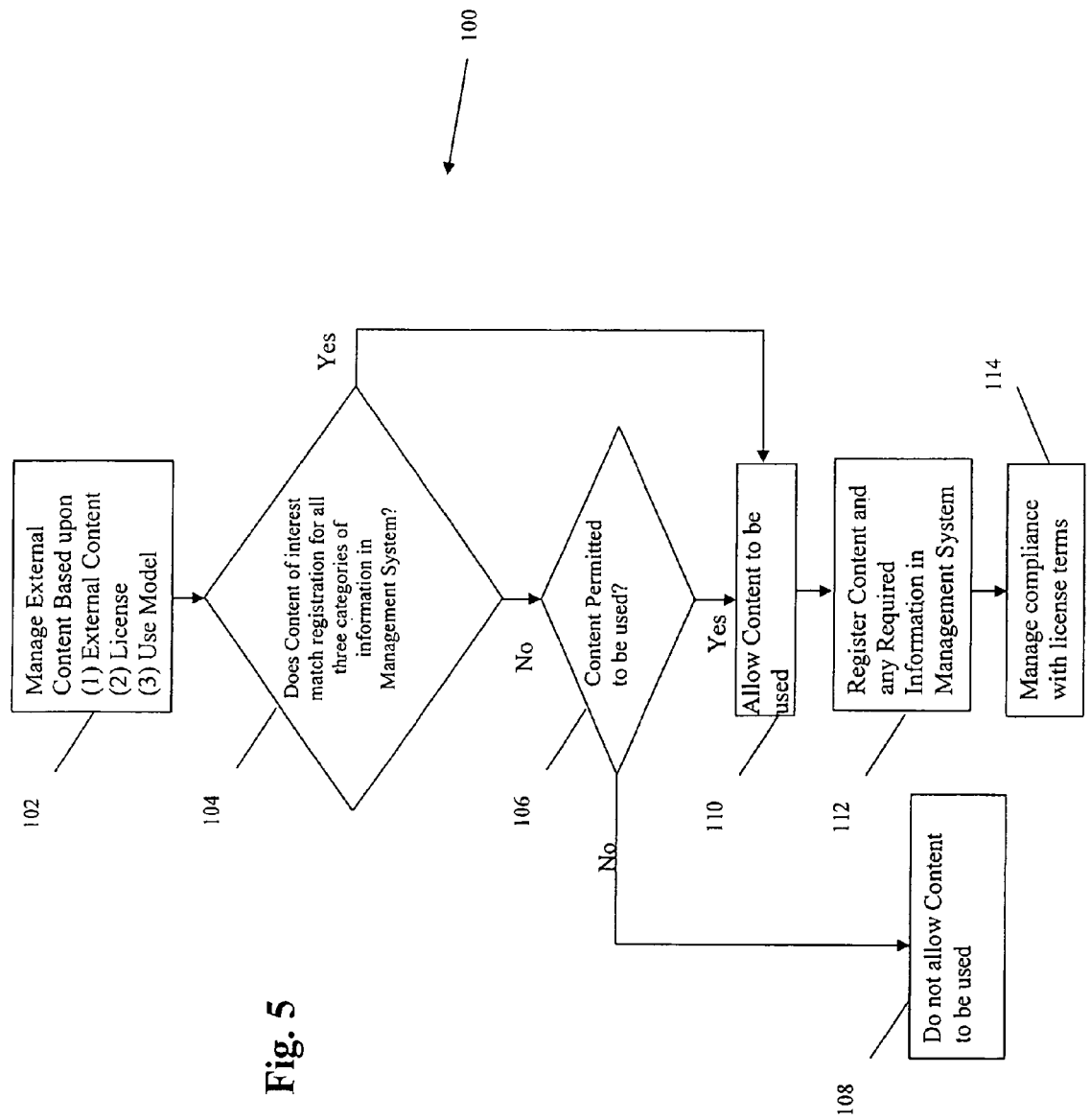
FIG. 5 illustrates a process for managing external software according to some embodiments of the invention.

The present section describes an illustrative embodiment of the invention. FIG. 5 shows a process flow 100 for a process of managing external content that may be utilized by a software tracking and management system according to the illustrative embodiment. At 102, a unique item of external content is tracked in the system in some embodiments using identifying information, such as for example, (1) the external content itself, (2) the license agreement or type associated with the software code, and (3) the "use model" associated with external content.

For example, with respect to external content that is embodied as software code, tracking may be performed against specific external code items that are separately identifiable to be used in or with a company's product. This software code could be, for example, an entire program, one or more modules, one or more libraries, or an external software tool. It is noted that the present description of an illustrative embodiment of the invention may be explicitly described with respect to external content comprised of software code, but this explicit description is for purposes of explanation and not for purposes of limitation.

The license agreement refers to the license agreement or license type associated with the software code. It is noted that the same license agreement may be associated with multiple different items of external content. For example, the GPL license may be associated with multiple different external content items. Therefore, in one embodiment, when a particular type of license is registered into the system, it is summarized and stored for future use of the same license type. In this manner, external content having the same or similar license obligations can be categorized together and managed more efficiently as a group.

The use model refers to the specific implementation to which the external content is directed. The same items of external content may be used and implemented in different ways, and the different implementation and use models may result in differing set of obligations. For example, an external software library may be linked using either static linking or dynamic linking. Under certain license agreements, statically linking a library may impose different obligations from dynamic linking. As a further example, the external content may be used in a way that either creates modifications or is used as originally acquired without creating a modification. The use model that causes a modification may impact license requirements that requires making the modification available to the originator of the external code or to other third parties. Another example of different use models relate to the creation of derivative works. A use model that causes the creation of a derivative work may impose drastically different obligations than a use model that does not result in a new derivative work.

When a request is made to use an item of external content, a determination is made whether all three items of information are registered in the correct combination for the external content of interest (104). If so, and authorization had previously been granted for using or integrating the external content, then approval is given for using the external content with the given license agreement for the defined use model (112). The system then manages compliance with the terms of the license agreement and any internal controls mandated by the company (114).

If all three items of information have not yet been registered for the external content in the correct combination, then a further determination is made whether authorization is to be granted for using the external content (106). This activity may involve different organizational entities within the company. For example, the legal department may become involved to analyze and review the license agreement, and to determine the legal acceptability of the external content and its associated license. The business or technology organization/management may become involved to review the business and technical reasons for using the external content, and analyze the business or technical acceptability of using the external content.

The determination of whether authorization is to be given may be a manual process of having individuals make a decision based upon review of the submittal material. For example, legal department personnel may review and make a determination of legal acceptability based upon a review of the license agreement. A line manager may review the business case for using the external content and any associated license fees. A technical manager may review the software code for technical acceptability.

In an alternate embodiment, the determination of whether authorization is to be given is an automated process. A legal review could consist of analysis based upon prior reviews for the same or similar license terms. Business and technical decisions for similar types and use models of the software code made in the past can be used to guide an automated decision making process for determining the business or technical acceptability of the external content. Analysis guideline and tests may be used to address situations that are not similar or the same as prior analysis decisions. Heuristics may be employed to adjust analysis decisions based upon patterns and results of previous analysis or the specified analysis guidelines.

If authorization is not given for the external content, then the Requestor is informed of the decision at 108. The circumstances of the rejection may be recorded into the system and/or a database system to guide future decisions that have the same or similar circumstances.

If authorization is given for the external content, then the Requestor is informed of the approval decision at 110. The external content and any other information needed or desired for compliance or approval is registered in the system (112). The system then manages compliance with the terms of the license agreement and any internal controls mandated by the company (114).

Figure 6:
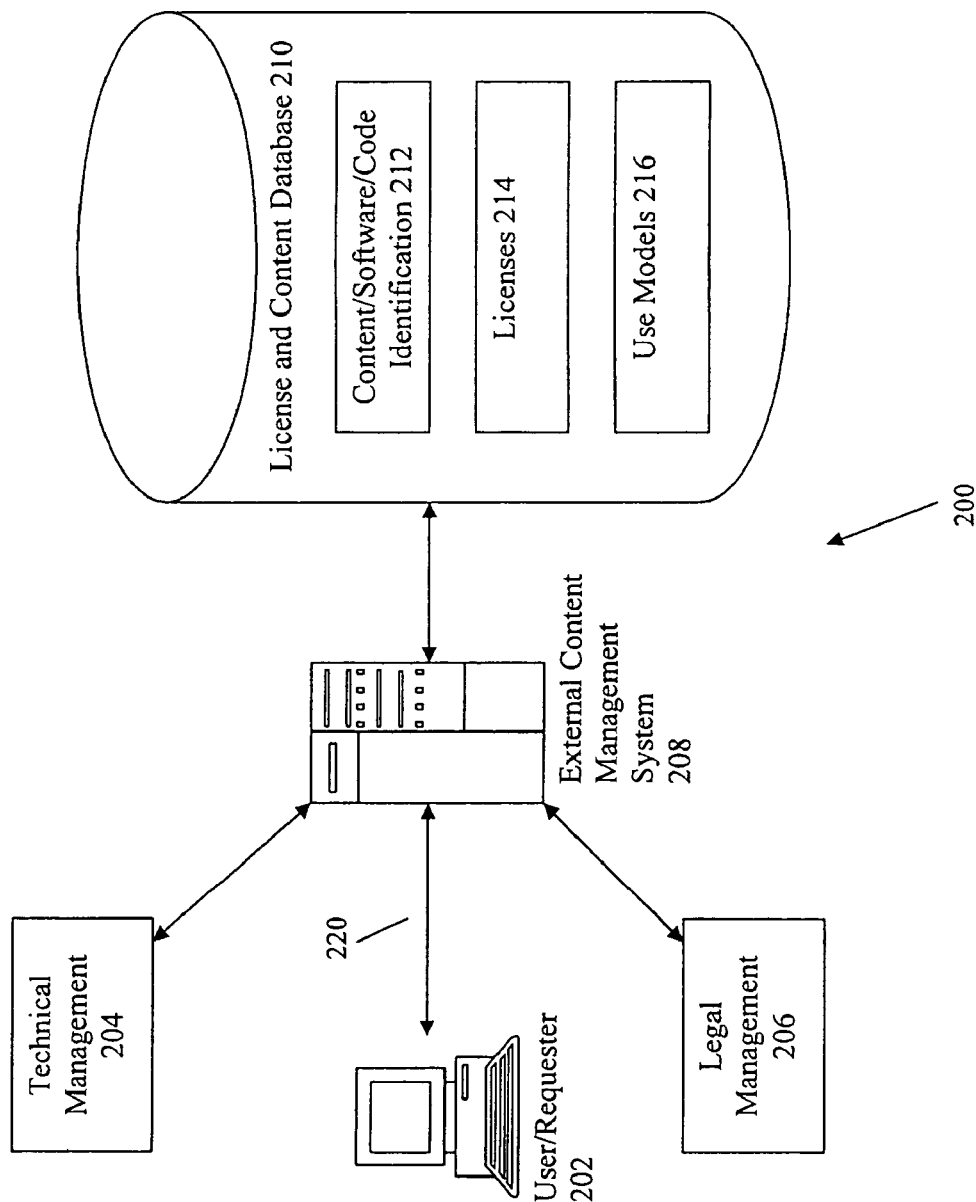
FIG. 6 shows an architecture for implementing a management system according to some embodiments of the invention.

FIG. 6 shows an architecture 200 for a management system 208 according to an embodiment of the invention. The management system 208 comprises the management software and routines to implement the processes described herein.

One or more requestor stations 202 may be used to submit requests to use external content to the management system 208. The requestor stations 202 may be any suitable interface device or software that can be used to submit a request for using external content. For example, the requestor station 202 could be implemented using a Web interface running on a computer station connected to an internal company network 220.

The management system 208 interfaces with a database 210. The database 210 includes, for example, the registration information for the content items 212 (e.g., software code items), license agreement registration information 214, and use model registration information 216. A record may be created for a particular item based upon item information 212, license information 214, and use model information 216. Each instance of an external content that have undergone the approval process may be associated with a distinct record in database 210. While not shown, some embodiments of the database 210 will also comprise data regarding past decisions and information relating to compliance management.

The management system 208 may interface with different organizational departments within a company. For example, the management system 208 may interface with technical/business management systems or personnel 204. The management system 208 may also interface with legal management systems or personnel 206.

In operation, when there is a particular use model that an engineer wishes to record for a particular combination for a software license and software combination, the combination will be recorded and a request will be automatically processed in a workflow to obtain approval. The request is routed to the appropriate levels of authorization and approval within the organization where approval is obtained depending on how the license is categorized. If approval is obtained, then the registration is recorded into one or more records at the database. Others in the department or organization can always go back to that record and review the terms under which that particular usage was approved.

In one embodiment, there is no requirement as to the order in which the items of information 212, 214, and 216 are entered into the system. For example, a standard type of license may be analyzed, summarized, and/or entered into the system at an earlier date, and new items of software corresponding to that license type may be recorded at a later date.

Figure 7:
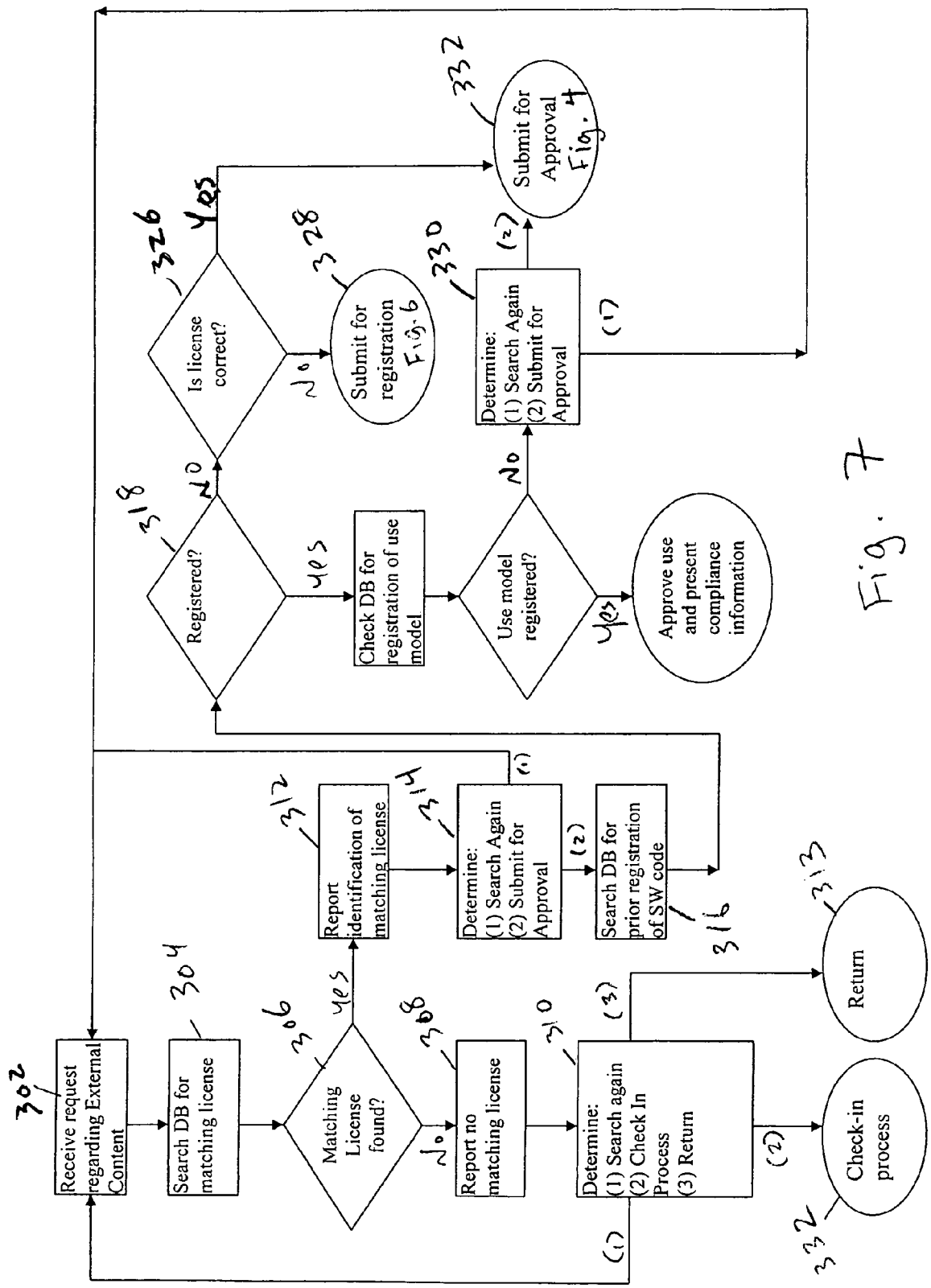
FIG. 7 shows a process for handling a request to use external software according to some embodiments of the invention.

FIG. 7 shows a flowchart of a process for implementing a management system according to some embodiments of the invention. At 302, a request is received to the management system to use an item of external content. In the present embodiment, the request includes the identity of the external content, the license agreement type or name, and the expected use model.

At 304, a search is performed to query the management database for the license identified in the request. A determination is made at 306 whether the queried license or license type can be found in the database. If not, then at 308 a message is displayed to the Requestor indicating that the queried license cannot be found in the system. The Requestor is given the option at 310 of returning to 302 to search again, to submit the license type for approval at 332 (described further below with respect to FIG. 8), or to return to the top level request menu at 313.

If the queried license is found in the database, then at 312 a message is displayed to the Requestor indicating that a match has been found in the database for the requested license. The Requestor is given the option at 314 of either returning back to 302 to perform another search or to continue forward with the request process to use the external content.

If the Requestor selects the option to seek approval, then a determination is made at 318 regarding whether the external content item is already registered in the management system. This action is performed at 330 by searching the management database for the external content identified the original request. If a match is found for the external content in the software management database, then a further check is made at 322 to determine whether the particular use model identified in the request is also registered for that external content. If the requested combination of item, license, and use model is already registered and had received prior approval, then the present request is automatically approved at 324. In one embodiment, compliance information is also presented to the Requestor at 324.

If the particular use model identified in the request is not found at 322, then the Requestor is given the option of either returning back to 302 to perform another search or to continue forward to 332 to seek approval to use the external content (described further below with respect to FIG. 8).

If the external content is not found to be registered at 318, then a further determination is made at 326 to check whether the correct license has been identified or found from the management database. If the license is correct, then the system continues to 332 to seek approval to use the external content (described further below with respect to FIG. 8). If the license is not correct, then the system continues to 328 to submit the license for registration (described further below with respect to FIG. 10).

Figure 8:
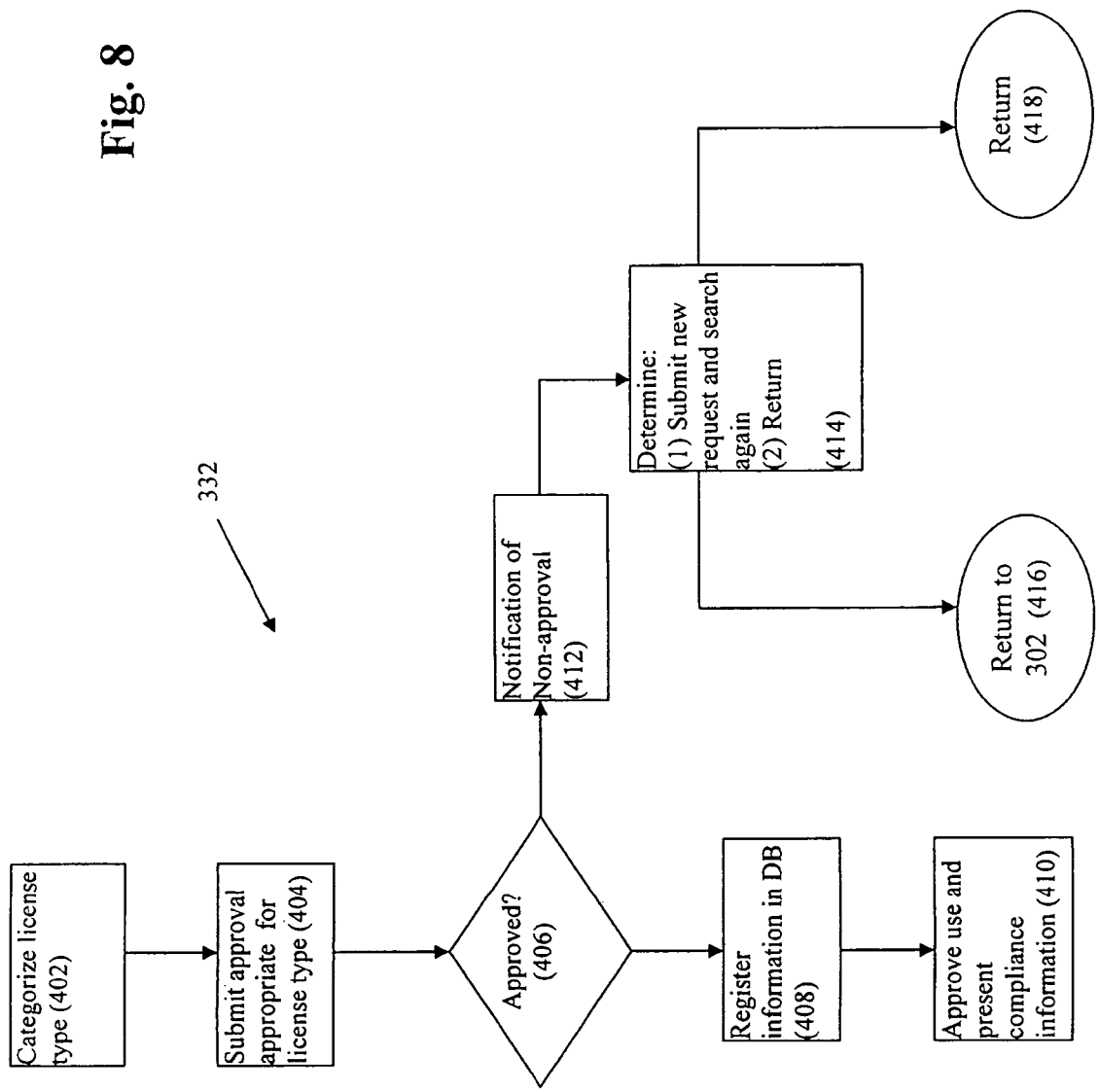
FIG. 8 shows an approval process according to some embodiments of the invention.

FIG. 8 shows a flowchart detailing specific steps according to some embodiments of the invention to implement action 332 from FIG. 7 to obtain approval of a given combination of an item of external content, an already registered license, and a particular use model. At 402, categorization is performed for the specific license or type of license associated with the external content. As previously noted, different licenses may be associated with varying levels of license terms and restriction, which may impose different levels of legal, technical, business, and/or administrative burdens upon an organization that seeks to use or integrate the external content. Certain types of licenses, such as GPL-based licenses, are far more burdensome than other types of licenses, such as freeware license or public domain software. Action 402 is performed to categorize the specific license under analysis to determine the relative level of risk or burden associated with the external content. The action 402 to categorize the license may not be needed if such categorization has already been performed for the license under analysis, and previous categorization results are available for review.

In one embodiment, the action 402 to categorize the license type is performed automatically, based upon the identification, characteristics, or terms of the license agreement. In an alternate embodiment, this action is performed manually by the appropriate personnel within the organization designated to categorized such licenses.

At 404, the approval request is submitted in a manner that is appropriate for the category of license under analysis. As noted above, different categories of license may present different levels of risk and burden to the organization. As such, the system is configured to provide different levels of approval processing based upon the specific category of license that is undergoing approval review. For example, an item of external content associated with a high-risk/burden license will undergo a more stringent approval process as compared to an item of external content that is associated with a less risky and/or less burdensome license type.

The approval process may be performed using a manual process of having individuals with appropriate approval authority make a decision based upon review of the submittal material. For example, legal department personnel may review and make a determination of legal acceptability based upon a review of the license agreement. A business or technical manager may review the business/technical case for using the external content. The approval process may also be performed automatically. A legal review could be performed based upon prior reviews for the same or similar license terms. Business and technical decisions for similar types and use models of the software code made in the past can be used to guide an automated decision making process for determining the business or technical acceptability of the external content. Analysis guideline and tests may be used to address situations that are not similar or the same as prior analysis decisions. Heuristics may be employed to adjust analysis decisions based upon patterns and results of previous analysis or the specified analysis guidelines.

At 406, a determination is made whether the request to use the external content is approved. If approval is granted at 406, then the approval and other needed or desired information for the requested combination is registered at 408 in the management system and its associated database. A message is displayed to the Requestor indicating approval of the request at 410, and in one embodiment, compliance information is also presented to the Requestor.

If approval is not granted at 406, then a message is provided to the Requestor indicating that the request has been denied. At 414, the Requestor is given the option of either returning back to 302 (of FIG. 7) to submit another request or to return back to the top level request menu.

In some embodiments, the different licenses are categorized into three categories of license types associated with increasing levels of potential risk and burden to an organization. A license associated with category 1 is considered the least risky and/or least burdensome type of license agreement for external content. As a result, this type of license agreement corresponds to a lesser standard of review to determine approval in the management system. A license that is within category 2 is considered to have a medium level of risk and/or burden to the organization. This type of license agreement corresponds to a higher level of review that is needed to obtain approval. A license agreement associated with category 3 is considered to present the greatest level of risk and/or burden to the organization. Therefore, this type of license agreement will receive the greatest level of scrutiny prior to approval.

Figure 9:
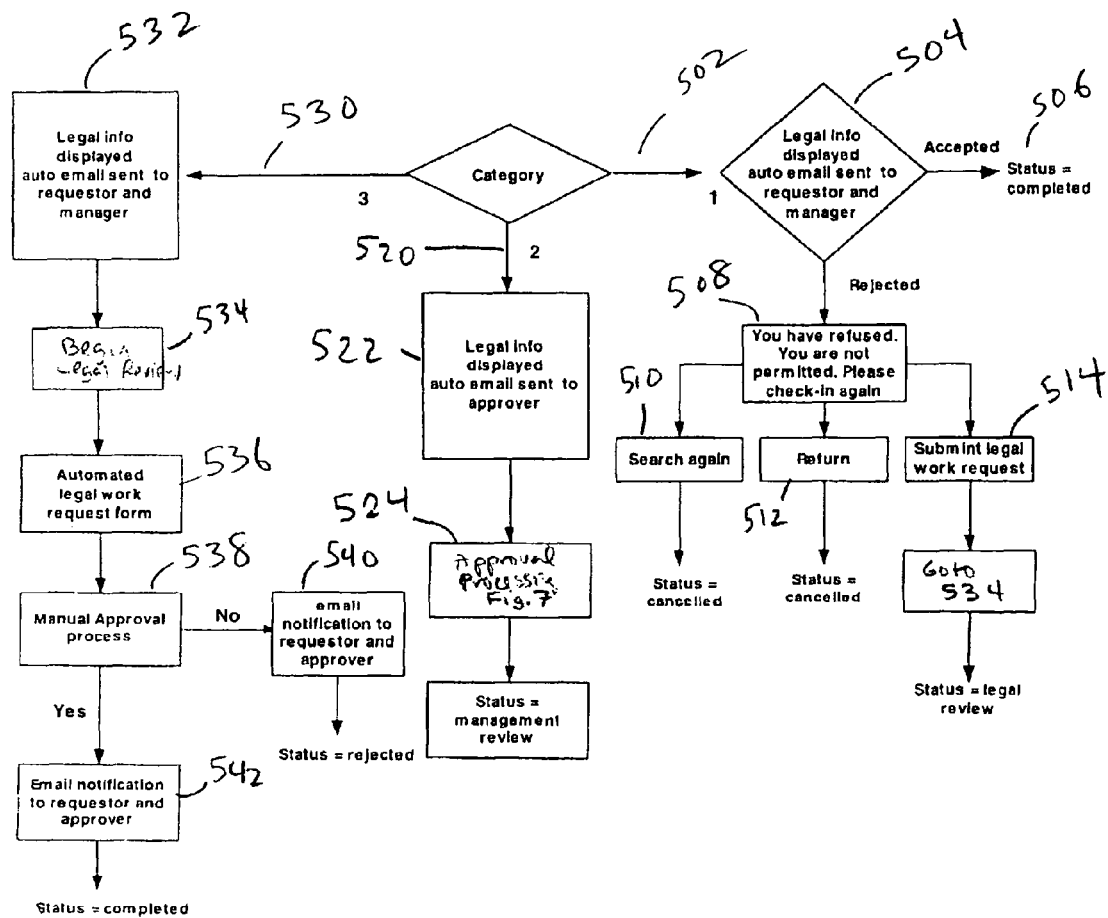
FIG. 9 shows a process for handling approval of different categories of licensed external software according to some embodiments of the invention.

FIG. 9 shows a process flow to obtain approval for the three categories of licenses according to some embodiments of the invention. The embodiment shown in FIG. 9 describes an approach in which designated personnel within the organization provide manual approval of the request.

Licenses that are categorized in category 1 undergo the approval process along path 502. At 504, the approval request and information, e.g., legal information associated with the request, are sent to both the Requestor and the business and/or technical manager associated with the request. In the present embodiment, the approval request is automatically sent, e.g., via email, to the Requestor and manager.

Examples of information presented to the Requestor and manager include details regarding requirements, restrictions, compliance guidelines for the external content. A question may be presented requesting the viewer to answer whether the restrictions and guidelines are understood and will be complied with. The viewer can choose to either accept or reject the displayed restrictions and guidelines. Because the external content is in category 1, action 504 is mainly for recording purposes. Therefore, if the Requestor fills out the requested fields in an appropriate manner and accepts the guidelines, then approval is automatically granted. If accepted at 504, then the status of the request is completed at 506 and the process continues to finalize the approval and/or compliance process.

If the guidelines and conditions are rejected at 504, then a message is provided to the Requestor at 508 indicating that the request has been denied. The Requestor may be presented with numerous options to proceed at this point. For example, the Requestor can be given the option of either performing another search at 510, returning to the main request menu at 512, or to submit a request for additional consideration from the legal department. A legal work request can be submitted at 514 to engage the legal review process, by proceeding to box 534 (described further below).

Licenses that are categorized in category 2 undergo the approval process along path 520. External content classified into category 2 presents more challenges as compared to the items associated with category 1. Category 2 items is generally handled in a similar manner as category 1 items, by displaying information and asking the Requestor to fill in necessary fields for approval. However, unlike category 1 items, automatic approval is not given. Instead, the approval request is routed to the appropriate management level for approval.

At 522, the approval request and legal information associated with the request are sent to the designated approver that has authority to approve category 2 licenses. In the present embodiment, the approval request is automatically sent, e.g., via email, to the designated approver. The process proceeds to 524 to obtain management approval.

Figure 11:
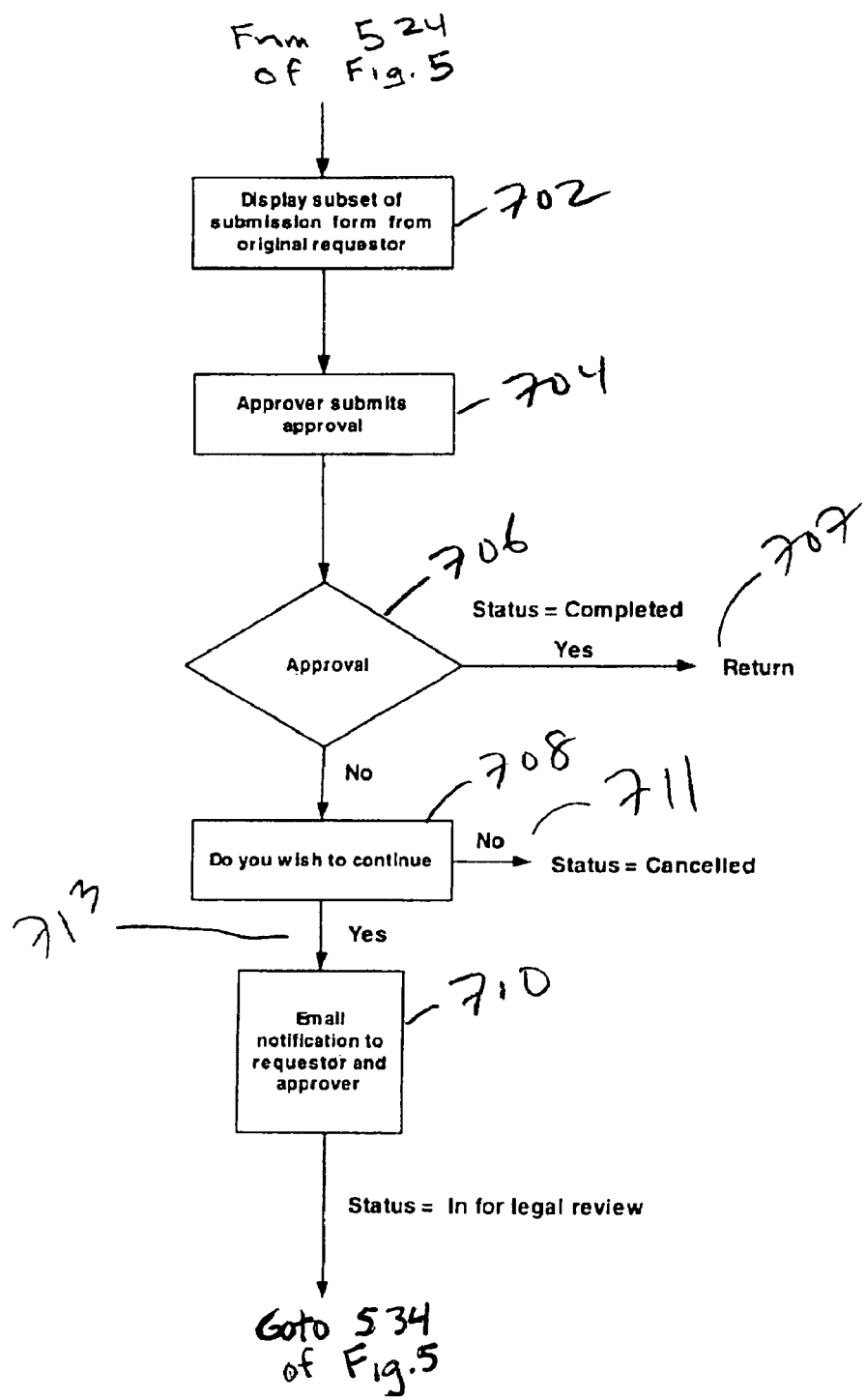
FIG. 11 shows a process for handling an approval request according to some embodiments of the invention.

The action 524 of obtaining management approval is described in FIG. 11. At 702 of FIG. 11, a subset of the information from the original request submission is provided to the designated approver. The subset of information comprises the appropriate amount of information needed by the approver to render a decision regarding approval of the request. At 704, the approver submits his approval decision to the management system. At 706, the management system checks whether the approver has approved the request to use the external content. If the approver has given suitable approval, then the status of the request is completed at 707 and the process returns to finalize the approval and/or compliance process.

If the approver does not approve the request, then a message is provided to the Requestor at 708 indicating that the request has been denied. Additional options to proceed may be presented at this point. For example, an option can be given to end the request process (711), or to continue the process and submit a request for additional consideration from the legal department (713). If the option to continue has been elected, then a notification is made to both the Requestor and the approver at 710. The process proceeds to submit a legal work request to engage the legal review process, by proceeding to box 534 of FIG. 9.

Returning back to FIG. 9, licenses that are categorized in category 3 undergo the approval process along path 530. External content classified into category 3 undergo the most stringent approval process, requiring legal approval before final authorization can be given. As before, at 532, the approval request and information, e.g., legal information associated with the request, are sent to both the Requestor and the manager associated with the request. In the present embodiment, the approval request and information are automatically sent, e.g., via email, to the Requestor and manager.

At 534, the legal review process begins. An automated legal work request is automatically generated and distributed to appropriate legal personnel or groups at 536. At 538, a legal approval process is performed, e.g., a manual legal approval process. If approval is denied at 538, then a notification message is provided to the Requestor and approver at 540 indicating that the request has been denied. If approval is granted at 538, then a notification message is provided to the Requestor and approver at 542 indicating that the request has been approved, the status of the request is completed, and the process returns to finalize the approval and/or compliance process.

Figure 10:
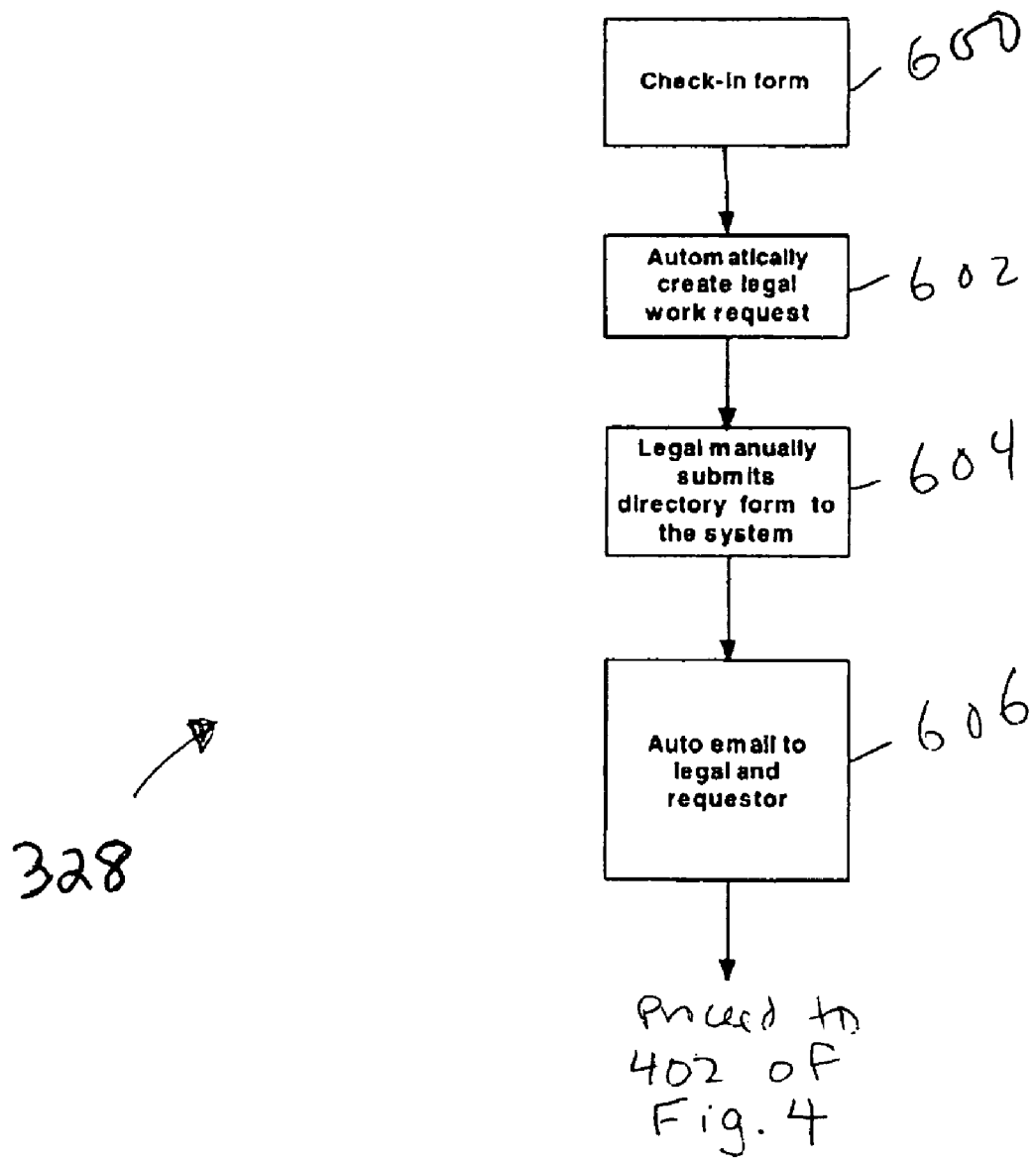
FIG. 10 depicts a process flow of a process for registering an external software license according to some embodiments of the invention.

FIG. 10 shows the process steps used to implement action 328 to submit a new license for registration (introduced in FIG. 7). This is the process flow to handle license that are not yet registered in the management system. Any suitable approach may be used to initiate process 328. For example, a check-in form 600 may be used to provide license information needed to initiate process 328. Fields in the check-in form are completed by the Requestor to provide sufficient information to register the license. Fields that are filled out in the check-in form include, for example, the source or originating location of the external content and the specific product and/or product module(s) with which the external content is expected to be used.

At 602, process 328 automatically generates a request to register the license in the management system. In one embodiment, this is implemented by automatically creating a legal work request to register the license. The information relating to the license is submitted to the software management database to register the license. In one embodiment, this action is manually performed by having legal personnel manually submits the directory form information, e.g., from the check-in form, into the management system. In an alternate embodiment, the action is automatically performed by taking the electronic form of the information from the check-in form and populating appropriate fields in the software management database to register the license.

Once the license has been registered, an automatic notification is made, e.g., via email, to the Requestor and to the legal department. The process then proceeds to box 402 of FIG. 8 to complete the approval process.

Figure 12:
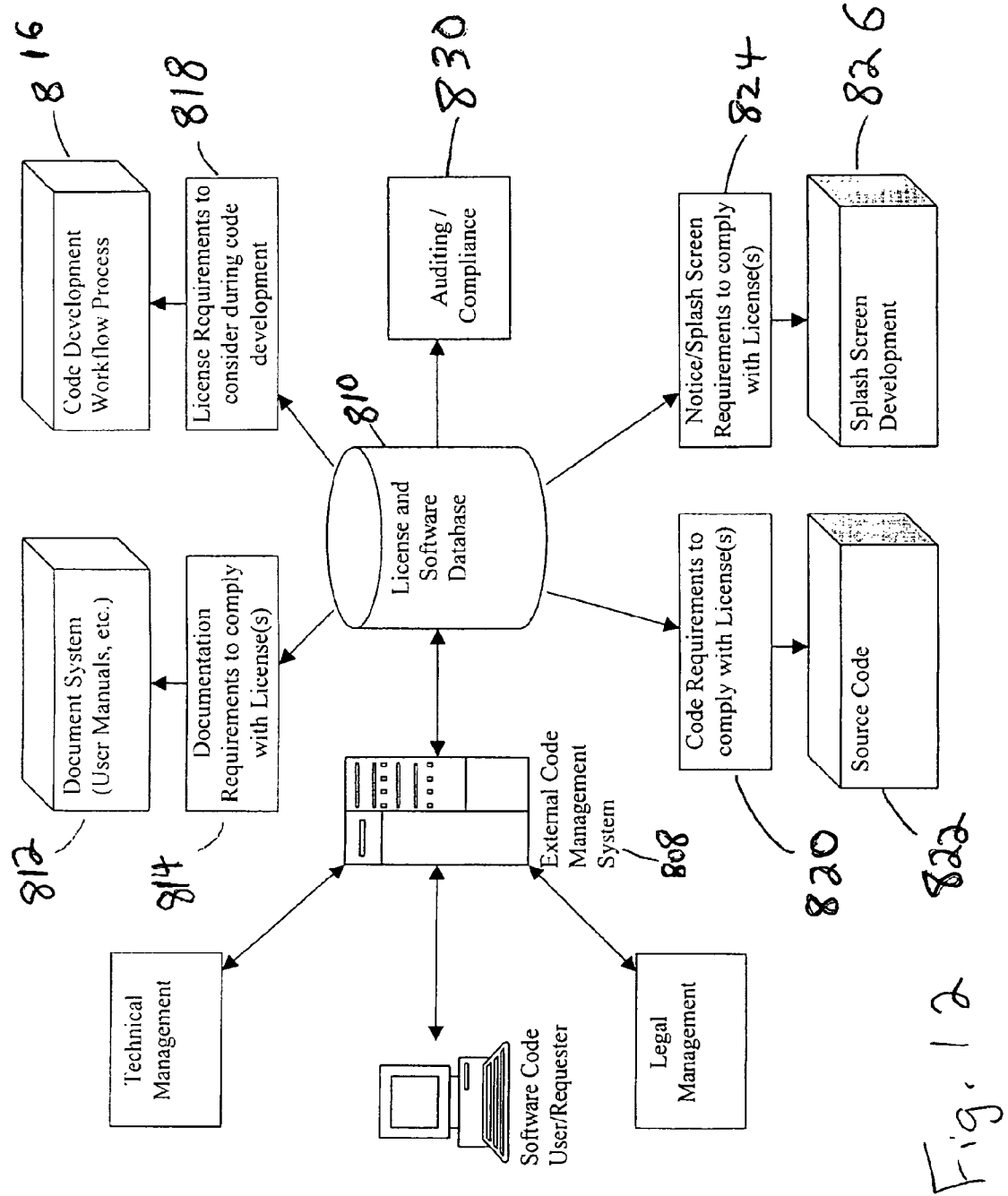
FIG. 12 illustrates a management system according to some embodiments of the invention that interacts with other systems within an organization.

The present management system can be leveraged and integrated into other software management processes and system within an organization. Several examples of such integration are shown in FIG. 12. FIG. 12 shows an embodiment of the management system 808 communicatively coupled to a software management database 810.

Many external code licenses include a requirement that certain notices or messages must be presented to an end user. For example, many types of open source software are distributed with a license agreement that require documentation associated with any product using or incorporating the open source software to include an attribution statement identifying the source of the open source software. As another example, many open source software require disclaimer language, e.g., a warranty disclaimer language, to be reproduced in documentation provided to an end user.

Some embodiments of the invention provide for interaction and/or integration of the management system 808 and management database 810 with documentation systems 812 to automatically ensure compliance with such documentation requirements for external content licenses. A module 814 is implemented to identify documentation requirements for licenses registered in the database 810 that must be followed to ensure compliance with registered license terms. These documentation requirements may be stored as a separate field in the database 810 during the registration process. For example, any statements that must be reproduced from the license agreement, e.g., attribution statements, are identified and stored in the database 810. The products associated with the documentation requirements of the relevant license agreement(s) are also identified from the database 810. The module 814 will deliver the statements to be reproduced and send those statements to the documentation system 812 to be associated with the appropriate documents for the identified products. The statements are then embedded into the documentation for the identified products.

In one embodiment, this action to modify the documentation can be automated, by maintaining placeholders within the documents for interaction with the management system 808. The required statements for all license agreements associated with the product documentation can be embedded at the placeholder location within the document. Alternatively, the statements are embedded in a manual process. In the manual approach, the module 814 generates a notification to personnel that work on the documentation system 812 with specific instructions to modify the documentation to include the required statements.

In a similar manner, the software development system 808 may be used to ensure that the organization's products include splash screens 826 that comply with notice requirements of the external content licenses. A module 824 may be used to analyze license requirements that have been registered in database 810. Any notices that must be incorporated into a splash screen can be automatically or manually generated into the splash screens 826.

Many external code licenses also include specific requirements regarding the content, composition, or format of product software that incorporate the external content. For example, many types of open source software require certain notices, such as copyright notices, to be retained and/or placed within any software code that incorporates the external content.

Some embodiments of the invention provide for interaction and/or integration of the management system 808 and software management database 810 with source code systems or repositories 822 to automatically ensure compliance with coding, requirements from external content licenses. A module 820 is implemented to identify coding requirements for licenses registered in the database 810 that must be followed to ensure compliance with registered license terms. These documentation requirements may be stored as a separate field in the database 810 during the registration process. For example, any copyright notices that must be retained from the license agreement are identified and stored in the database 810. The products associated with the documentation requirements of the relevant license agreement(s) are also identified from the database 810.

The module 820 will check the source code 822 associated with the license requirements to determine the source code 822 complies with the license agreement. If the source code 822 does not comply with the coding requirements of the license agreement(s), then a notification message is automatically generated for the appropriate parties responsible for taking corrective action. In an alternative embodiment, the module 820 will correct the compliance problem by automatically inserting the required notices into a comment section of the source code 822.

It is often important that the developers within the software development process be aware of the various terms, conditions, and approved use models for external content to be used or incorporated into an organization's products. For example, a type of information that is very important to a developer is the information that a given code library from an external source must be dynamically linked into the product, and should be statically linked. This type of use model restriction may occur, for example, with regard to external content libraries licensed under a license agreement that considers the act of static linking to create a derivative work which has more onerous license terms than the act of dynamic linking which may not be considered to create a derivative work under the license.

Some embodiments of the invention provide for interaction and/or integration of the management system 808 and management database 810 with an organization's code development workflow process or workflow systems 816 to automatically provide notification and checkpoints for ensuring compliance and distribution of information regarding license terms, conditions, and approved use models. A module 818 is implemented to identify information from the database 810 that is relevant to the organization's software development workflow.

Other types of auditing, search, and compliance systems 830 may interact and interface with the software with the management system 808 and software management database 810. This allows the organization to search the database 810, e.g., by product or module, to identify all external content and associated license terms that have been used with the product or modules. In one embodiment, the system is searchable at any granularity of the product, limited only by the granularities in which associations are recorded in the database 810 for the external content.

System Architecture Overview

Figure 13:
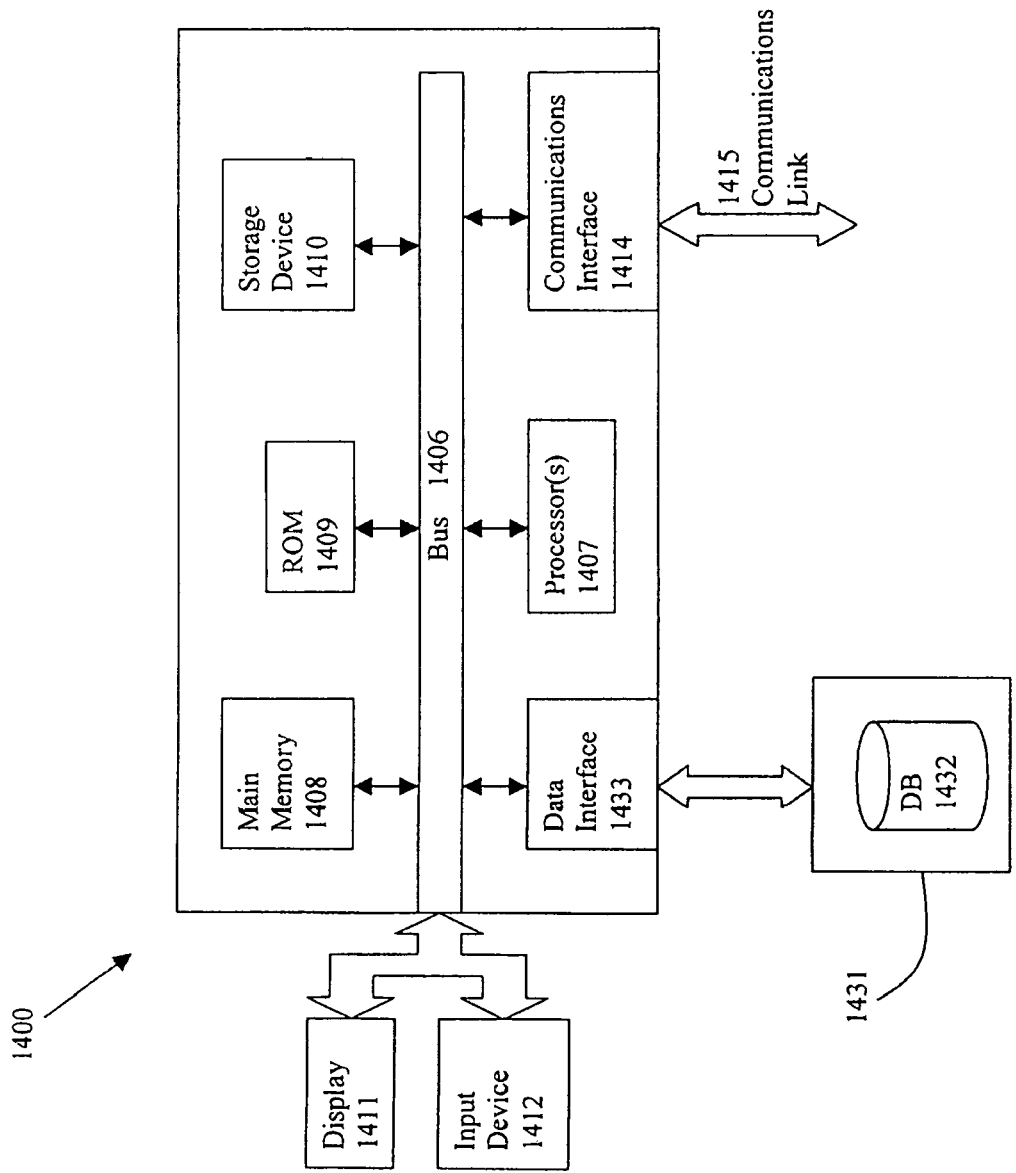
FIG. 13 illustrates an example computing architecture with which embodiments of the invention may be practiced.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1408. Transmission media includes coaxial cables, copper wire, and fiber optics, including wires that comprise bus 1406. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system of an internal developer for managing external content, comprising:
   a database of the internal developer that seeks to use the external content that is developed by an external developer that is not the internal developer, wherein
      the database is configured to track information regarding the external content by issuing a query against one or more repositories of the internal developer to check one or more requirements of the external content against one or more products developed by the internal developer;
   a first system component, the first system component configured to manage the information in the database, wherein at least a part of the information stored in the database is identified by at least analyzing contents of the external content; and
   a second system component configured to manage approval for using the external content with the one or more products developed by the internal developer, in which
      the approval is based at least in part upon analyzing the information in the database, and
      the act of using the external content comprises using the external content in conjunction with the product or integrating a form of the external content into the product of the internal developer.

2. The system of claim 1 in which the first system component collects, organizes, or registers the information.

3. The system of claim 1 in which the information comprises one or more licenses, one or more external content, or one or more use models.

4. The system of claim 3 in which the one or more licenses are categorized.

5. The system of claim 4 in which the one or more licenses are categorized according to type of license or to license terms.

6. The system of claim 5 in which the type of license corresponds to an open source, freeware, or commercial license.

7. The system of claim 3 in which at least one of the one or more licenses corresponds to multiple items of external content.

8. The system of claim 3 in which the use model relates to a type of linking or creation of a derivative work.

9. The system of claim 8 in which a third system component checks license requirements against the contents of the product or related information, packaging, contents, or documentation.

10. The system of claim 9 in which third system component checks notice or attribution statements within the contents of the product or the related information, packaging, contents, or documentation.

11. The system of claim 9 in which the notice or attribution statements comprise a copyright notice, attribution statement, legal disclaimer, or license copy.

12. The system of claim 1 further comprising one or more requestor stations.

13. The system of claim 1 capable of interfacing with different organizational departments or department systems within an organization.

14. The system of claim 13 in which the different organizational departments comprise either a legal department system, a technical management system, or a business management system.

15. The system of claim 1 in which the second system component searches for the information upon a request to use the external content in the product.

16. The system of claim 15 in which the second system component determines if the information regarding the external content that is present in the database is sufficient to approve or disapprove the use of the external content within the product.

17. The system of claim 16 in which an approval or disapproval decision is facilitated based upon whether the information is sufficient for making the decision.

18. The system of claim 16 in which additional information is input into the database using the first system component if the information is insufficient to approve or disapprove the use of the external content in the product.

19. The system of claim 1 in which the first system component manages approvals according to different categories for different items of external content.

20. The system of claim 19 in which approval or disapproval is automated based upon the information.

21. The system of claim 19 in which approval or disapproval is based upon a previous decision for the external content.

22. The system of claim 19 in which the external content provides either first burdens or risks for an approval decision or the first or second burdens or risks for a disapproval decision.

23. The system of claim 19 in which approval or disapproval is a manual process based upon the information.

24. The system of claim 19 in which approval or disapproval is a combination of manual processing and automated processing based upon the information.

25. The system of claim 1 further comprising:
a third system component for determining whether the product complies with license requirements associated with the external content.

26. The system of claim 25 in which the third system component compliance performs auditing.

27. The system of claim 1 further comprising:
a fourth system component for automatically implementing compliance with license requirements associated with the external content.

28. The system of claim 27 in which the third system component generates notice or attribution statements and inserts the notice or the attribution statements within the contents of the product or related information, packaging, contents, or documentation.

29. A computer implemented method for managing external content by an internal developer, comprising:
using at least one processor programmed for performing:
identifying a database of the internal developer that seeks to use the external content that is developed by an external developer that is not the internal developer;
tracking information in a database of the internal developer regarding the external content by issuing a query against one or more repositories of the internal developer to check one or more requirements of the external content against one or more products developed by the internal developer;
managing the information in the database, wherein
at least a part of the information stored in the database is identified by at least analyzing contents of the external content; and
managing approval for using the external content with the one or more products developed by the internal developer, wherein
the approval is based at least in part upon analyzing the information.

30. The computer implemented method of claim 29, wherein the act of using the external content comprises using the external content in conjunction with the product or integrating a form of the external content into the product of the internal developer.

31. The computer implemented method of claim 29, further comprising:
causing at least one of the one or more product to comply with at least one of the one or more requirements of the external content.

32. The computer implemented method of claim 31, wherein the act of at least one of the one or more products to comply with the one or more requirements of the external content comprises automatically modifying at least one of the one or more products to comply with the at least one of the one or more requirements.

33. A computer program product comprising a computer readable storage medium having a sequence of instructions which, when executed by at least one processor, causes the at least one processor to execute a process for managing external content by an internal developer, the process comprising:
using at least one processor programmed for performing:
identifying a database of the internal developer that seeks to use the external content that is developed by an external developer that is not the internal developer;
tracking information in a database of the internal developer regarding the external content by issuing a query against one or more repositories of the internal developer to check one or more requirements of the external content against one or more products developed by the internal developer;
managing the information in the database, wherein
at least a part of the information stored in the database is identified by at least analyzing contents of the external content; and
managing approval for using the external content with the one or more products developed by the internal developer, wherein
the approval is based at least in part upon analyzing the information.

34. The computer program product of claim 33, wherein the act of using the external content comprises using the external content in conjunction with the product or integrating a form of the external content into the product of the internal developer.

* * * * *